(12) United States Patent
Tsuchida

(10) Patent No.: US 6,386,619 B1
(45) Date of Patent: May 14, 2002

(54) RETAINERLESS WEATHER STRIP

(75) Inventor: Hideshi Tsuchida, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 9 days.

(21) Appl. No.: 09/598,924

(22) Filed: Jun. 22, 2000

(30) Foreign Application Priority Data

Aug. 24, 1999 (JP) .......................................... 11-237121
Aug. 24, 1999 (JP) .......................................... 11-237122

(51) Int. Cl.⁷ ................................................. B60J 5/00
(52) U.S. Cl. ..................... 296/146.9; 296/93; 49/498.1; 49/479.1
(58) Field of Search ............................... 296/146.9, 93, 296/134, 213; 428/122; 49/490.1, 498.1, 479.1, 489.1, 475.1, 502, 377

(56) References Cited

U.S. PATENT DOCUMENTS

| | | | |
|---|---|---|---|
| 4,114,320 A | * 9/1978 | Pullan | 49/491 |
| 4,505,965 A | * 3/1985 | Zipperle | 428/122 |
| 4,549,761 A | * 10/1985 | Lee et al. | 296/146 |
| 4,929,481 A | * 5/1990 | Iwasa | 296/93 |
| 5,352,009 A | * 10/1994 | Takeuchi | 296/146.9 |
| 5,556,672 A | * 9/1996 | Akachi et al. | 49/475.1 |
| 5,636,895 A | * 6/1997 | Ito et al. | 296/146.9 |
| 5,649,405 A | * 7/1997 | Morihara et al. | 296/146.9 |
| 5,918,421 A | * 7/1999 | Nozaki | 49/498.1 |
| 6,131,342 A | * 10/2000 | Miyamoto et al. | 49/498.1 |
| 6,138,415 A | * 10/2000 | Ohtsu et al. | 49/490.1 |
| 6,250,018 B1 | * 6/2001 | Kawai et al. | 49/479.1 |
| 2001/0008050 A1 | * 7/2001 | Kawai et al. | 49/479.1 |

FOREIGN PATENT DOCUMENTS

| | | | |
|---|---|---|---|
| JP | 58-133918 | * | 8/1983 |
| JP | 1-109145 | * | 4/1989 |
| JP | 2-227322 | * | 9/1990 |
| JP | 10-236163 | * | 9/1998 |
| JP | 11-180151 | * | 7/1999 |
| JP | 2000-264072 | * | 9/2000 |
| JP | 2001-63381 | * | 3/2001 |

* cited by examiner

*Primary Examiner*—Ken Patel
(74) *Attorney, Agent, or Firm*—Sughrue Mion, PLLC

(57) ABSTRACT

A retainerless weather strip to be fixed to a door panel of an automobile by a clip, which comprises: a base bottom portion to be attached to the door panel; a hollow seal portion to seal between the door panel and a body panel; and a seal lip portion, wherein the base bottom portion has a cutout-shaped step portion formed at a lower end portion on the automobile exterior side of the base bottom portion, and the weather strip further comprises a thick waterproof sponge member provided on the cutout-shaped step portion, wherein the thick waterproof sponge member has a thickness sufficiently larger than the depth of the cutout-shaped step portion, and has an elasticity such that a portion in which the clip is located and portions in which the clip is not located can be equally elastically contracted when the base bottom portion is fixed to the door panel by the clip so that watertightness is kept between the thick waterproof sponge member and the door panel.

6 Claims, 7 Drawing Sheets

RETAINERLESS WEATHER STRIP

FIELD OF THE INVENTION

The present invention relates to a weather strip attached to a door panel of an automobile by an attaching means except for a retainer. The present invention also relates to a weather strip fixed to a door panel of an automobile by a clip, and having a waterproof sponge member, which is attached to the base bottom portion, for ensuring watertightness of the door panel at the base bottom portion. The present invention also relates to a weather strip which is attached to a door panel of an automobile by an attaching means except for a retainer and on the lower face of the base portion of which a seal member closely coming into contact with the door panel is arranged.

BACKGROUND OF THE INVENTION

Referring to FIGS. 4 and 5 (or FIGS. 8 and 9), a conventional technique is explained below. A door weather strip 170 (260) for automobile use is mostly attached by a retainer 171 (221) mounted on a door panel 130 (220). However, in this case, in order to ensure the sealability between the retainer 171 (221) and the door panel 130 (220), a connecting portion to connect the retainer 171 (221) with the door panel 130 (220) is coated with sealant 172 (222). Accordingly, the weather strip 170 (260) and the sealant 172 (222) interfere with each other. Therefore, the conventional technique has a problem that the sealability of this connecting portion can not be stabilized. Further, at an end portion of the retainer 171 (221), a step portion is created between the retainer 171 (221) and the door panel 130 (220) corresponding to the thickness of the retainer 171 (221). Accordingly, the sealability of this portion is deteriorated. For the above reasons, when importance is placed upon maintaining the sealability of the connecting portion to connect the door panel 130 (220) with the weather strip 170 (260), it is not necessarily required to provide the retainer 171 (221).

Instead of a retainer, it is possible to use an adhesive double-coated tape or a clip as a means for attaching a weather strip to a door panel.

As shown in FIGS. 1 and 2, there have been provided a conventional weather strip 70 which include: a base bottom portion 72 attached to a door panel 20; a hollow seal portion 73 to seal between the door panel 20 and the body panel 30; and a seal lip portion 74. This conventional weather strip 70 is fixed to the door panel 20 by not a retainer but a clip 40. In order to enhance the watertightness with respect to the door panel 20, there is provided a waterproof seal 78, which is a water expansion material and contains a corrosion inhibitor for preventing corrosion of metal, all over the attaching base bottom portion 72 as disclosed in Japanese Examined Utility Model Publication No. 6-42920. However, since the water expansion material containing the corrosion inhibitor is a solid material, it is impossible to put a seal upon the door panel 20 sufficiently.

In order to solve the above problems, it can be considered to take countermeasure that a sponge-like waterproof seal member 79 is attached to the entire lower surface of the base bottom portion. However, in the case where the weather strip is attached to the door panel with a clip, waves are created in the direction of length of the weather strip because only the sponge-like waterproof seal member 79 located close to the clip is compressed and deformed. That is, a portion of the weather strip 70 in which the clip 40 is located is attached to the door panel 20 by a stronger force than other portions. Therefore, the sponge-like waterproof seal member 79 is strongly compressed and the height is reduced. A portion in which the clip 40 is not located is attached to the door panel 20 by a weak force and the height of the sponge-like waterproof seal member 79 becomes larger. As a result, the entire shape of the sponge-like waterproof seal member 79 becomes wave-like.

The thus formed waves of the sponge-like waterproof seal member 79 are greatly affected by a reaction force of the sponge-like waterproof seal member 79. That is, in a state in which the weather strip 70 is fixed to the door panel 20 with the clip 40, it is preferable that the sponge-like waterproof seal member 79 is interposed between the lower face of the base bottom portion 72 of the weather strip 70 and the upper face of the door panel 20, and that the wall thickness of the sponge-like waterproof seal member 79 is equally contracted over the entire length. However, the reaction force of the sponge-like waterproof seal member 79 acts, and the portion in which the clip 40 is located is greatly elastically contracted and deformed because the reaction force is weaker than the attaching force of the clip 40. However, the portion in which the clip 40 is not located is not contracted and deformed so much by the attaching force of the clip 40. Therefore, the base bottom portion 72 of the weather strip 70 is pushed up by the reaction force. As a result, waves are created on the weather strip 70.

Since this conventional sponge-like waterproof seal member 79 is arranged between the base bottom portion 72 of the weather strip 70 and the door panel 20, the wall thickness of the seal member 79 is set at a small value. Therefore, a quantity of elastic deformation of contraction is small. Accordingly, when a force, the intensity of which is higher than a predetermined value, is given, a strong reaction force is generated, and waves tend to be created on the weather strip 70. As a result, watertightness between the weather strip 70 and the door panel 20 is deteriorated and further appearance is deteriorated.

On the other hand, in order to attach the weather strip 170 (260), to the door panel 130 (220) by the above means, it is necessary to stabilize the sealability between the lower face of a base portion (261) and the door panel 130 (220).

From the above viewpoints, a technique by which a highly expanded sponge member is arranged on a lower face of a base portion of a weather strip has been proposed. In the extrusion-molded portion of the weather strip, this highly expanded sponge member is integrally molded by extrusion at the cutout step portion formed on the lower face of the base portion of the extrusion-molded portion. In the die-molded portion, a separate highly expanded sponge member is made to adhere to the lower face of the flat base portion by a post-processing. The specific gravity of the highly expanded sponge member, which is integrally formed by extrusion molding, is usually 0.1 to 0.3, and the specific gravity of the highly expanded sponge member, which is formed separately and made to adhere to the die-molded portion, is usually 0.05 to 0.2.

However, in the die-molded portion, the separate highly expanded sponge member is made to adhere to the lower face of the base portion, which is a flat face. Therefore, it is impossible to set the thickness of the highly expanded sponge member at a high value. Since elasticity of a thin highly expanded sponge member is low, it tends to be plastically deformed, and it is impossible to stably keep the sealability over a long period of time. As a result, in one weather strip, the sealability is high in the extrusion-molded portion, however, the sealability is low in the die-molded portion, that is, it is impossible to exhibit a high sealability over the entire weather strip.

Since the lower face of the base portion of the die-molded portion and the separate highly expanded sponge member are made to adhere to each other on their flat faces, the area of adhesion is not necessarily sufficiently large. When the door is repeatedly opened and closed over a long period of time, the separate highly expanded sponge member slips out from the predetermined position and the sealability is lowered.

SUMMARY OF THE INVENTION

The present invention is to solve the above-described problems.

Accordingly, an object of the present invention is to provide a retainerless weather strip which does not causes waves due to the difference in an attaching force even when fixed by a clip and which thus is excellent in watertightness and appearance.

Another object of the present invention is to provide a retainerless weather strip which has a sufficiently high sealability between a lower face of a base portion of a die-molded portion and a door panel.

A still other object of the present invention is to provide a retainerless weather strip which has a sufficient adhesion area between a lower end face of a base portion of a die-molded portion and a highly expanded sponge member.

A still other object of the present invention is to provide a retainerless weather strip which has a stable sealability, over the entire weather strip, continuing from an extrusion-molded portion to a die-molded portion.

The other objects and effects of the present invention will become apparent from the following description.

The above objects of the present invention have been achieved by providing the following retainerless weather strips.

That is, in a first aspect, the present invention relates to a retainerless weather strip to be fixed to a door panel of an automobile by a clip, which comprises:

a base bottom portion to be attached to the door panel;
a hollow seal portion to seal between the door panel and a body panel; and
a seal lip portion,
wherein the base bottom portion has a cutout-shaped step portion formed at a lower end portion on the automobile exterior side of the base bottom portion, and the weather strip further comprises a thick waterproof sponge member provided on the cutout-shaped step portion,
wherein the thick waterproof sponge member has a thickness sufficiently larger than the depth of the cutout-shaped step portion, and has an elasticity such that a portion in which the clip is located and portions in which the clip is not located can be equally elastically contracted when the base bottom portion is fixed to the door panel by the clip so that watertightness is kept between the thick waterproof sponge member and the door panel.

In a second aspect, the present invention relates to a retainerless weather strip to be attached to a door panel of an automobile by an attaching means except for a retainer, which comprises:

an extrusion-molded portion including a base portion having a cutout: step portion formed on a lower face of the base portion of the extrusion-molded portion;

a highly expanded sponge member integrally provided on the cutout step portion by means of coextrusion molding;
a die-molded portion including a base portion having a step cut portion, which continues to the cutout step portion of the extrusion-molded portion, formed on a lower face of the base portion of a die-molded portion; and
a highly expanded sponge member provided on the step cut portion.

In a third aspect, the present invention relates to a retainerless weather strip to be attached to a door panel of an automobile by an attaching means except for a retainer, which comprises:

an extrusion-molded portion including a base portion, wherein the extrusion-molded portion has a cutout-molded portion at a predetermined portion thereof, in which the extrusion-molded portion is cutout remaining the base portion;
a highly expanded sponge member integrally provided along an automobile exterior side edge on a lower face of the base portion of an extrusion-molded portion by means of coextrusion molding; and
a die-molded portion formed by means of die molding and integrated with the cutout portion.

PREFERRED EMBODIMENTS OF THE INVENTION

Figure 1:
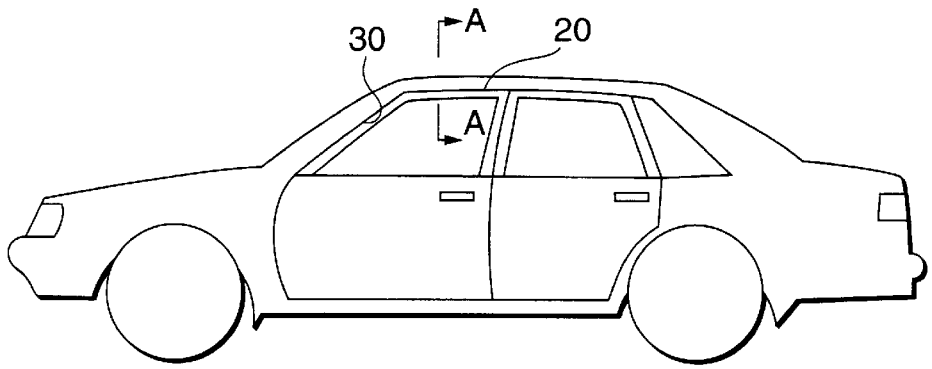
FIG. 1 is a side view showing an automobile into which a weather strip is incorporated.
Figure 2:
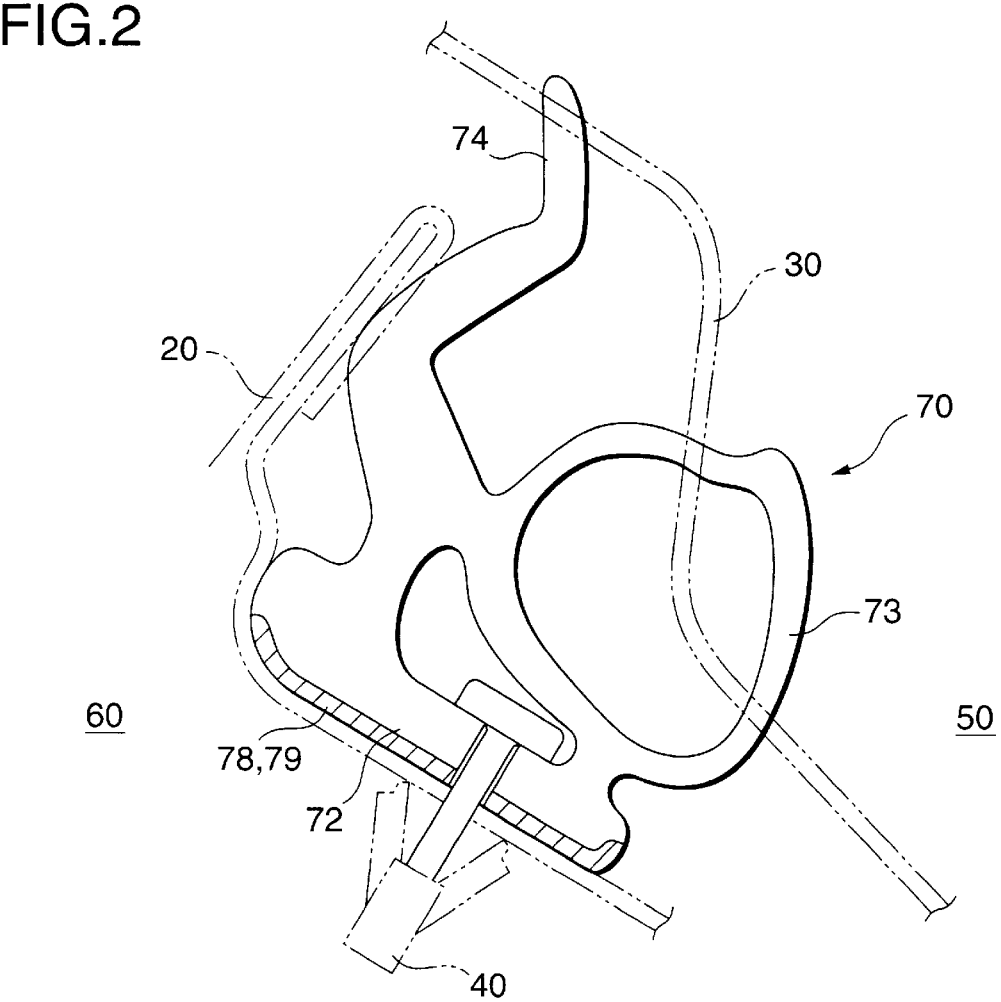
FIG. 2 is a cross-sectional view taken on line A—A in FIG. 1 showing a weather strip in which a conventional waterproof seal member is arranged.
Figure 3:
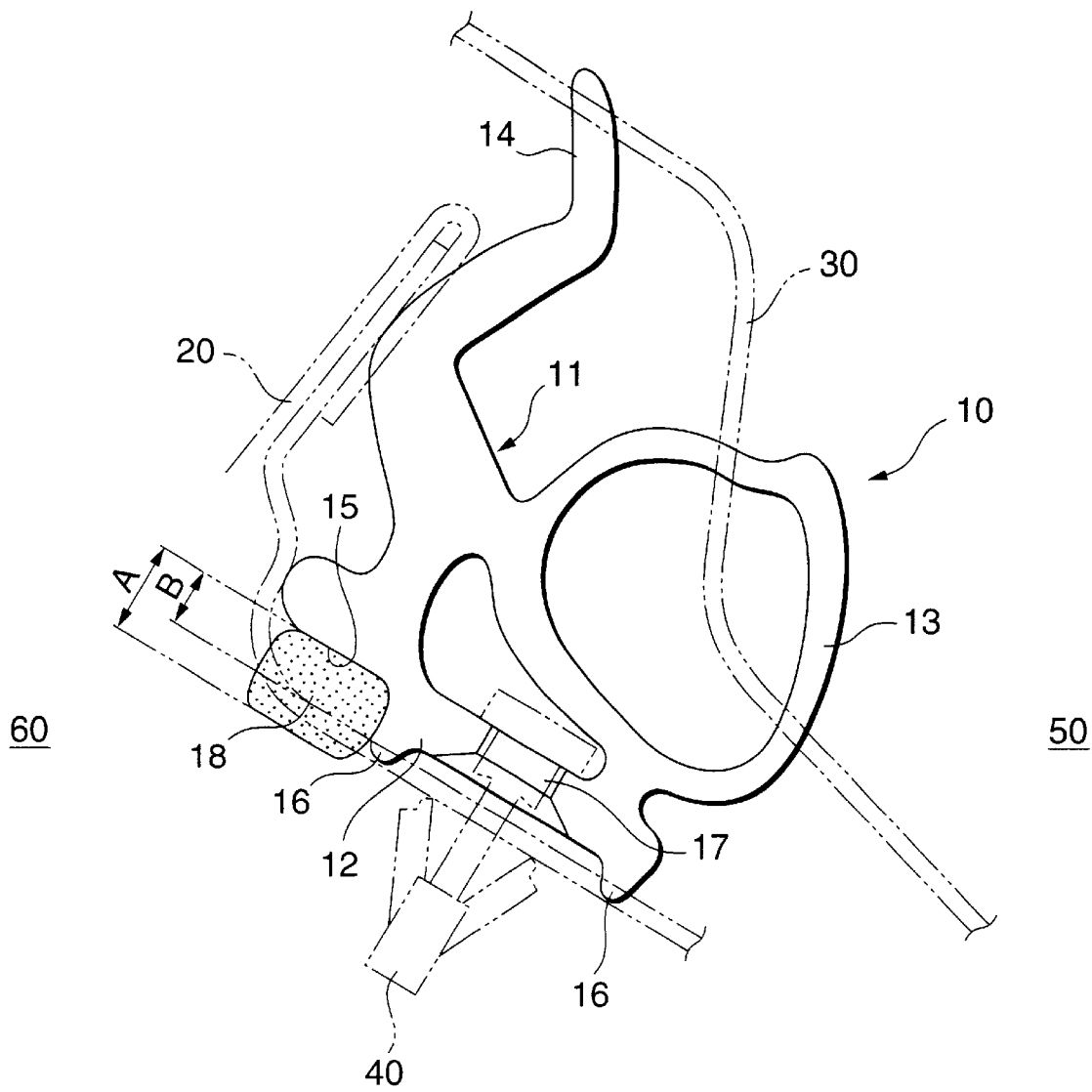
FIG. 3 is a cross-sectional view taken on line A—A in FIG. 1 showing a weather strip in which a thick waterproof sponge member of an embodiment of the present invention is arranged.

Referring to FIGS. 1 and 3, the first aspect of the present invention is explained below. The first aspect of the invention provides a retainerless weather strip comprising: a base bottom portion 12 to be attached to a door panel; a hollow seal portion to seal between the door panel and a body panel; and a seal lip portion, wherein the weather strip is fixed to the door panel 20 of an automobile by a clip 40, a cutout-shaped step portion 15 is formed at a lower end portion on the automobile exterior side 60 of the base bottom portion 12, a thick waterproof sponge member 18, the thickness of which is sufficiently larger than the depth of the step portion 15, is provided in the step portion 15, and the thick waterproof sponge member 18 has an elasticity so that a portion in which the clip 40 is located and a portion in which the clip 40 is not located can be equally elastically contracted when the base bottom portion 12 is fixed to the door panel 20 by the clip 40 and watertightness can be kept between the thick waterproof sponge member 18 and the door panel 20.

In a preferred embodiment, the waterproof sponge member is softer than other portions of the base bottom portion.

In another preferred embodiment, a protrusion 16 elastically coming into contact with the door panel 20 is provided between a clip insertion hole 17 of the base bottom portion 12 and the waterproof sponge member 18.

In a still other preferred embodiment, the protrusion 16 is formed being continued to the cutout-shaped step portion 15.

The weather strip 10 is fixed to the door panel 20 with the clip 40. The weather strip 10 includes: a weather strip body 11 having a base bottom portion 12, a hollow seal portion 13 elastically coming into contact with a body opening edge portion 30, and a seal lip portion 14; and a thick waterproof sponge member 18 integrally arranged at a lower end portion on the automobile exterior side 60 of the base bottom portion 12 of the weather strip body 11.

In the weather strip body 11, there is provided a cutout-shaped step portion 15 at a lower end portion on the automobile exterior side 60 of the base bottom portion 12. In the base bottom portion 12, there is formed an insertion hole 17 into which the clip 40 is inserted. On both the automobile exterior side 60 and the automobile interior side 50, there are provided protrusions 16. When the base bottom portion 12 is fixed to the door panel 20 with the clip 40, these protrusions 16 are elastically deformed and strongly come into elastic contact with the door panel 20, so that the watertightness between the weather strip 10 and the door panel 20 can be enhanced.

The thick waterproof sponge member 18 is integrally provided in the step portion 15 formed in the base bottom portion 12 of the weather strip body 11. The wall thickness of this thick waterproof sponge member 18 is sufficiently larger than the depth of the step portion 15. The elasticity of this thick waterproof sponge member 18 is such that when the base bottom portion 12 of the weather strip body 11 is fixed to the door panel 20 with the clip 40, a portion in which the clip 40 is located and portions in which the clip 40 is not located are equally contracted, and the watertightness with respect to the door panel 20 can be positively ensured. This thick waterproof sponge member 18 is made of sponge rubber. The waterproof sponge member is also referred to as a "highly expanded sponge member" in the specification.

Next, the operation of the first aspect of the invention is explained below. When the weather strip 10 of the above structure is fixed to the door panel 20 with the clip 40, the thick waterproof sponge member 18 arranged in the lower end portion on the automobile exterior side 60 of the base bottom portion 12 is elastically deformed and contracted, that is, the wall thickness of the thick waterproof sponge member 18 is contracted from wall thickness A to B as shown in FIG. 3. In this thick waterproof sponge member 18, the cutout-shaped step portion 15 is formed in the base bottom portion 12. When this cutout-shaped step portion 15 is formed, the wall thickness of the thick waterproof sponge member 18 can be made to be sufficiently larger than the wall thickness of the conventional sponge-like waterproof seal member. Accordingly, the quantity of elastic deformation of contraction can be made large and the reaction force can be reduced.

As a result, the portion in which no clip 40 is located is elastically deformed by contraction in the same manner as that of the portion in which the clip 40 is located. Therefore, weaves are not caused on the weather strip. Due to the foregoing, the appearance can be enhanced. Since the quantity of elastic deformation of contraction is large, the weather strip can be elastically contacted with the door panel 20. Therefore, the watertightness with the door panel 20 can be positively ensured.

According to the first aspect of the invention, the cutout-shaped step portion 15 is formed at the lower end portion of the base bottom portion 12 on the automobile exterior side 60, and the thick waterproof sponge member 18 is arranged in the step portion 15. Therefore, when the base bottom portion 12 is fixed to the door panel 20 with the clip 40, the thick waterproof sponge member 18 is uniformly deformed by contraction over the entire length of the thick waterproof sponge member 18. Accordingly, no waves are created on the weather strip 10, and the appearance can be kept excellent. Further, the watertightness with respect to the door panel 20 can be positively kept.

Figure 4:
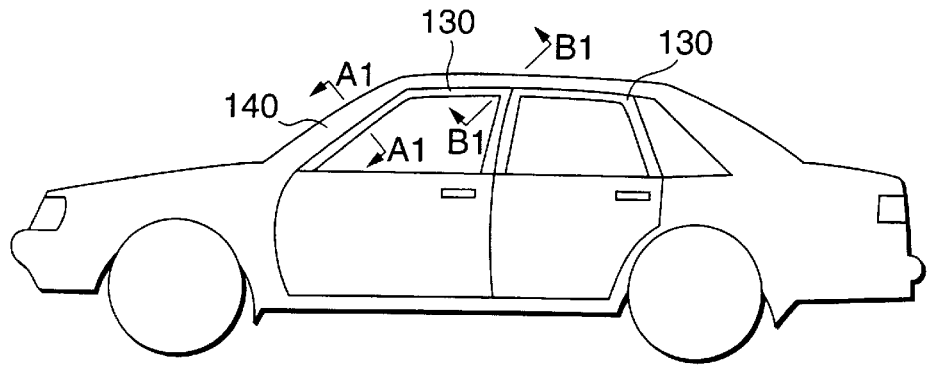
FIG. 4 is a side view showing an automobile into which a weather strip is incorporated.
Figure 5:
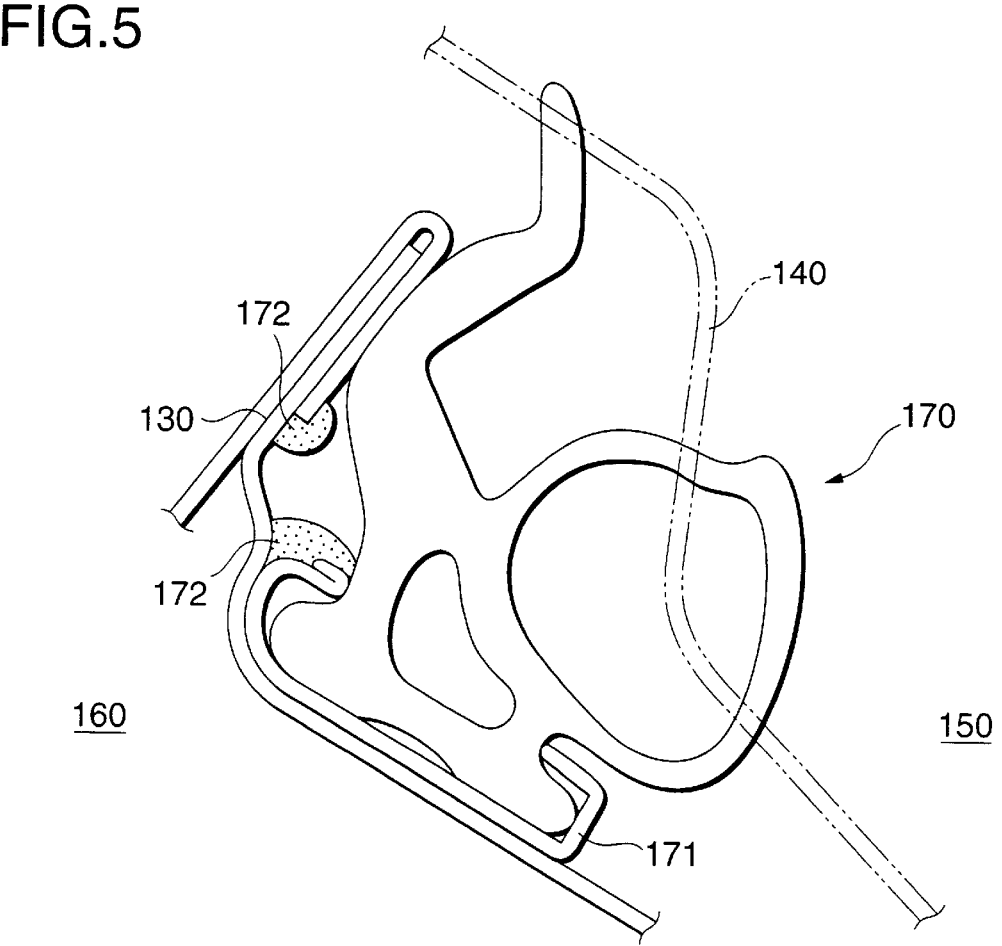
FIG. 5 is a cross-sectional view taken on line A1—A1 in FIG. 4 showing a conventional example.
Figure 6:
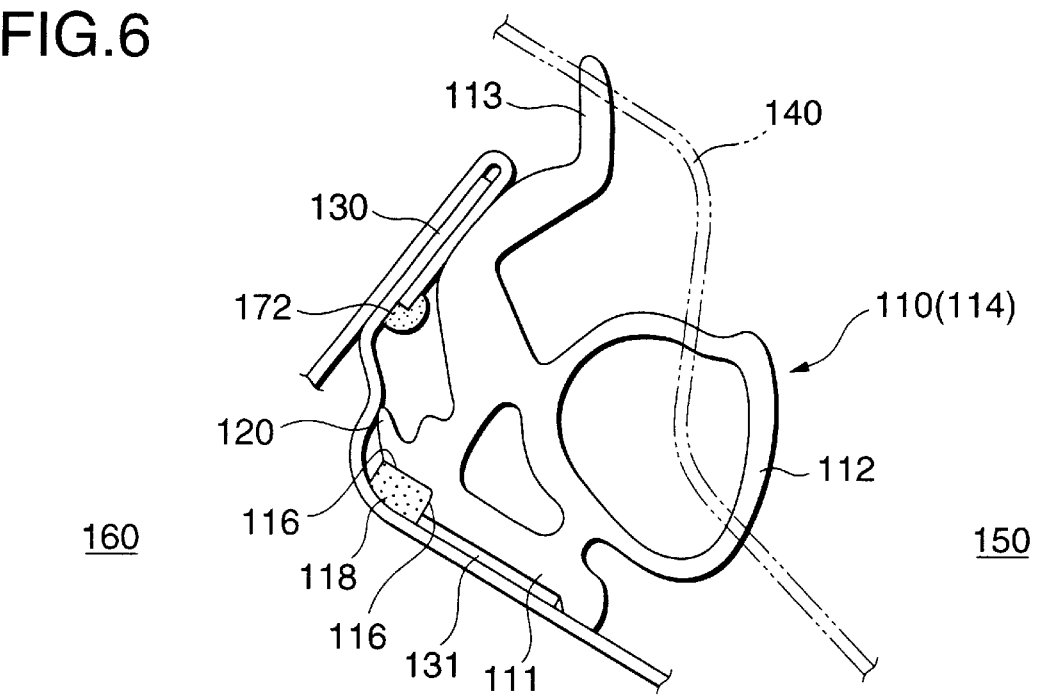
FIG. 6 is a cross-sectional view taken on line A1—A1 in FIG. 4 showing an embodiment of the present invention.
Figure 7:
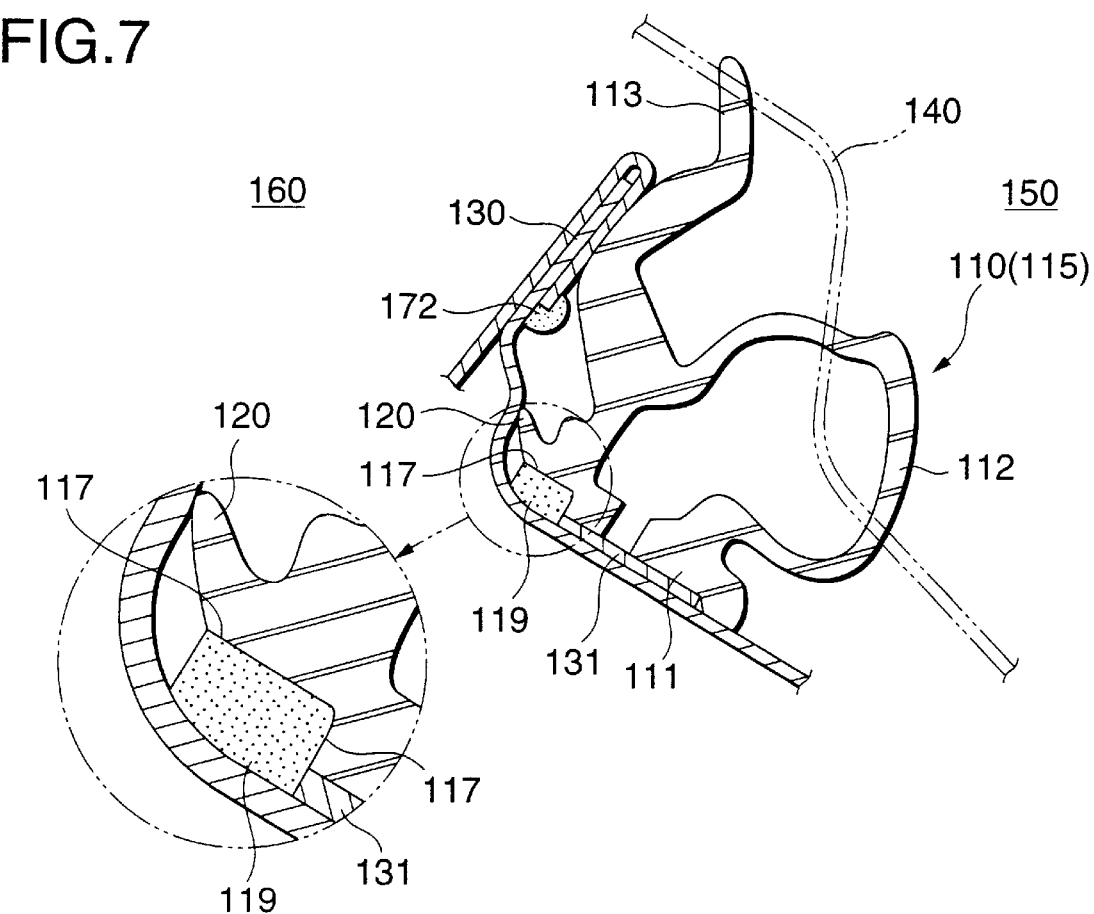
FIG. 7 is a cross-sectional view taken on line B1—B1 in FIG. 4 showing an embodiment of the present invention.
Figure 8:
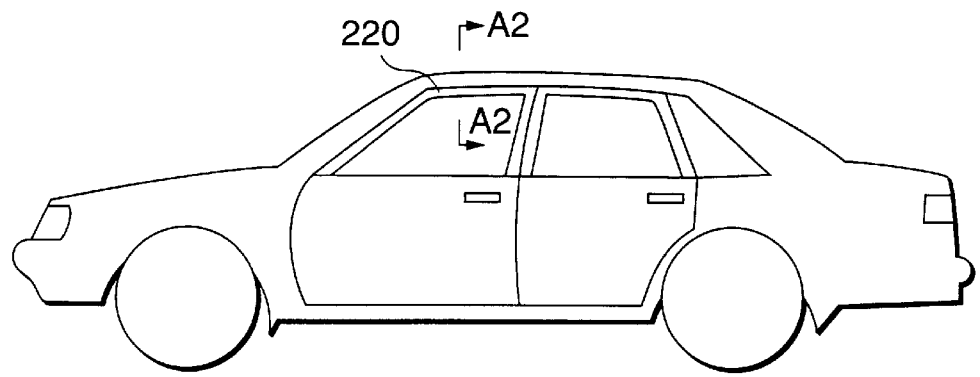
FIG. 8 is a side view showing an automobile into which a weather strip is incorporated.
Figure 9:
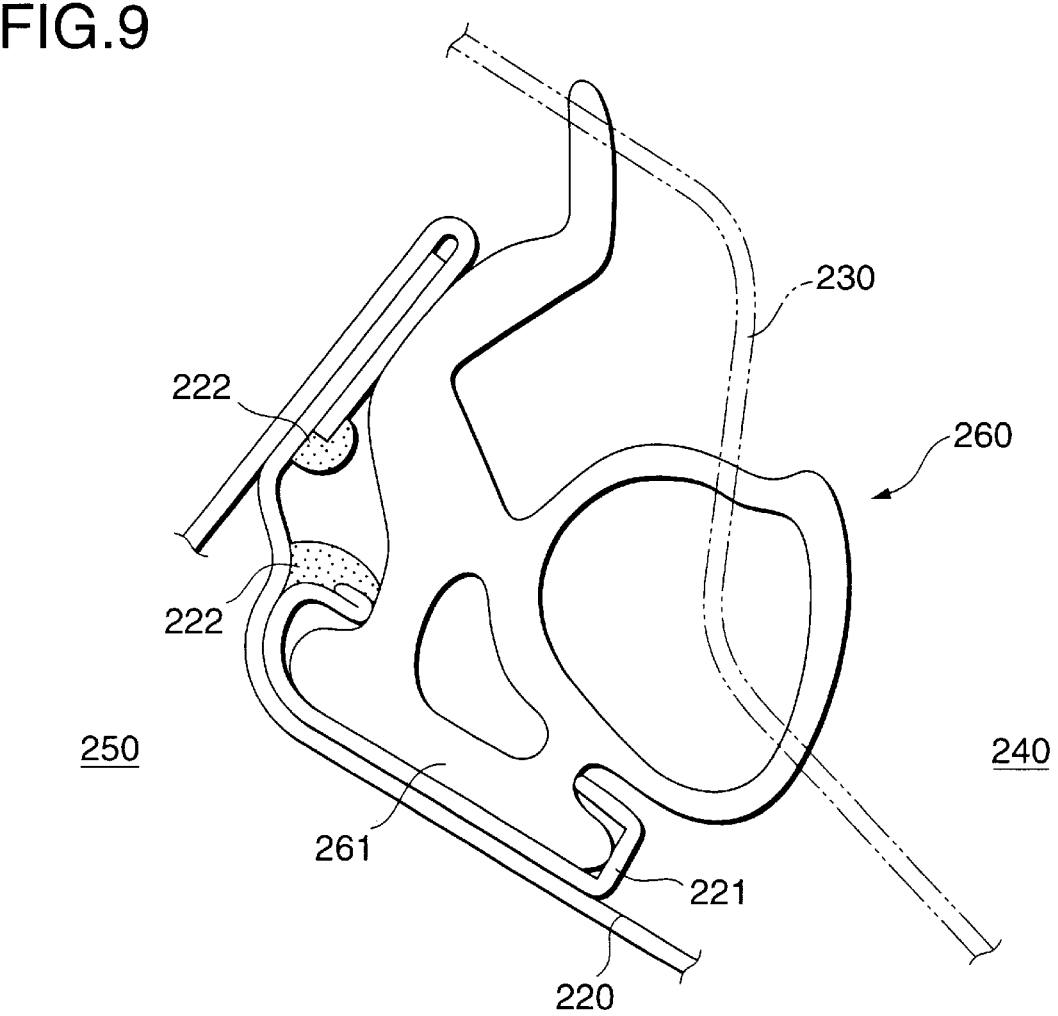
FIG. 9 is a cross-sectional view taken on line A2—A2 in FIG. 8 showing a conventional example.
Figure 10:
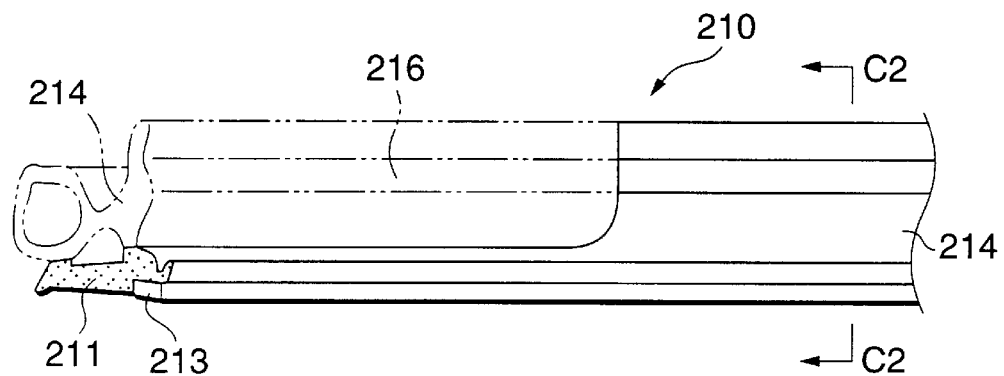
FIG. 10 is a partially perspective view showing a state in which a cutout portion is formed in an extrusion-molded portion.
Figure 11:
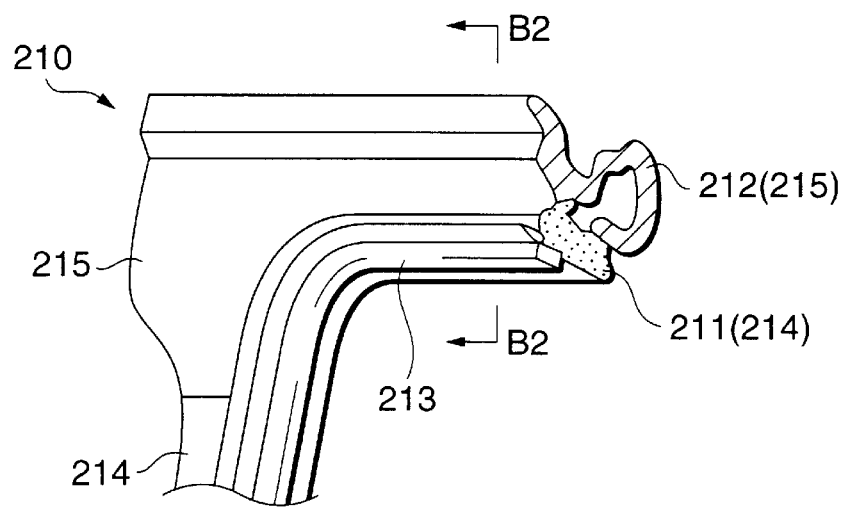
FIG. 11 is a partially perspective view showing a state in which a die-molded portion is integrated with the cutout portion shown in FIG. 10 by means of die molding.

Referring to FIGS. 4, 6 and 7, the second aspect of the present invention is explained below. The second aspect of the invention provides a retainerless weather strip to be attached to a door panel 130 of an automobile by an attaching means except for a retainer, in which: a highly expanded sponge member 118 is integrally provided in a cutout step portion 116 formed on a lower face of a base portion 111 of an extrusion-molded portion 114 by means of coextrusion molding; a step cut portion 117, which continues to the cutout step portion 116 of the extrusion-molded portion 114, is formed on a lower face of the base portion 111 of a die-molded portion 115; and a highly expanded sponge member 119, which is a separate body, is set in the step cut portion 117 by a post-processing.

The retainerless weather strip 110 is attached to a full door type door panel 130 of an automobile by an attaching means except for a retainer. The retainerless weather strip 110 includes: a base portion 111 attached to the door panel 130 by an adhesive double-coated tape 131; a hollow seal portion 112 located on the automobile interior side 150, elastically coming into contact with the body 140; and a seal lip portion 113 located on the automobile exterior side 160, elastically coming into contact with the door panel 130 and the body 140.

In this weather strip 110, in the cutout step portion 116 formed on the lower face on the automobile exterior side 160 of the base portion 111 of the extrusion-molded portion 114, the highly expanded sponge member 118 is integrally arranged by means of coextrusion molding.

On the lower face on the automobile exterior side 160 of the base portion 111 of the die-molded portion 115, the step cut portion 117, which continues to the cutout step portion 116 of the extrusion-molded portion 114 and the cross-section of which is the same as that of the cutout step portion 116, is formed by means of die molding. To this step cut portion 117, a highly expanded sponge member 119, which is formed separately and the cross-section of which is the same as that of the highly expanded sponge member 118 of the extrusion-molded portion 114, is made to adhere by a post-processing.

When the small lip 120 is protruded from the lower face on the automobile exterior side 160 of the base portion 111 and made to elastically come into contact with the door panel 130, the sealability between the weather strip 110 and the door panel 130 can be stabilized.

It is preferable that the characteristic of the highly expanded sponge member 119, which is formed separately and made to adhere to the die-molded portion 115, is the same as or similar to the characteristic of the highly expanded sponge member 118 arranged in the extrusion-molded portion 114. For example, it is preferable that the highly expanded sponge member 119 is made of continuous foam highly expanded sponge made of EPDM or single foam highly expanded sponge made of urethane.

In this connection, the weather strip 110 is attached to the door panel by an adhesive double-coated tape. However, the present invention is not limited to the above specific embodiment. As long as the attaching means is not a retainer such as a clip, any means may be adopted.

The operation of the retainerless weather strip 110 of this embodiment is explained blow. In this weather strip 110, the step cut portion 117, the structure of which is the same as that of the cutout step portion 116 of the extrusion-molded portion 114, is formed on the lower face of the base portion 111 of the die-molded portion 115 continuously to the cutout step portion 116 concerned, and the highly expanded sponge member 119, which is separately formed, is set at the step cut portion 117. Due to the foregoing, the thickness of the highly expanded sponge member 119, which is formed separately, can be made to be the same as that of the highly expanded sponge member 118. Therefore, its high elasticity can be stably kept over a long period of time, and the sealability between the die-molded portion 115 and the door panel 130 can be stabilized.

Since the highly expanded sponge member 119, which is formed separately, is made to adhere to the step cut portion 117, the area of adhesion between the highly expanded sponge member 119 and the base portion 111 can be made larger than that of the conventional weather strip. Accordingly, both of them can be strongly attached to each other. Consequently, there is no possibility that the highly expanded sponge member 119, which is formed separately, slips out from a predetermined position and the sealability is deteriorated. Slip of the highly expanded sponge member 119, which is formed separately, can be also prevented by the step structure of the step cut portion 117. Accordingly, the sealability can be stably kept high over a long period of time.

In this connection, the cutout step portion 116 of the extrusion-molded portion 114 continues to the step cut portion 117 of the die-molded portion 115. Therefore, the highly expanded sponge member 118 naturally continues to the highly expanded sponge member 119 which is formed separately. Due to the foregoing, the bottom face sealability of the base portion 111 can be continuously kept from the extrusion-molded portion 114 to the die-molded portion 115.

According to the second aspect of the present invention, the step cut portion 117, the structure of which is the same as that of the cutout step portion 116 of the extrusion-molded portion 114, is formed on the lower face of the base portion 111 of the die-molded portion 115 continuously to the cutout step portion 116 concerned, and the highly expanded sponge member 119, which is separately formed, is set at the step cut portion 117. Due to the foregoing, the thickness of the highly expanded sponge member 119, which is formed separately, can be made to be the same as that of the highly expanded sponge member 118. Therefore, its high elasticity can be stably kept over a long period of time, and the sealability between the die-molded portion 115 and the door panel 130 can be can be stabilized. As a result, the sealability can be stably exhibited in all the region of the weather strip 110.

Since the highly expanded sponge member 119, which is formed separately, is made to adhere to the step cut portion 117, the area of adhesion between the highly expanded sponge member 119 and the base portion 111 can be made larger than that of the conventional weather strip. Accordingly, both of them can be strongly attached to each other. Consequently, there is no possibility that the highly expanded sponge member 119, which is formed separately, slips out from a predetermined position and the sealability is deteriorated. Slip of the highly expanded sponge member 119, which is formed separately, can be also prevented by the step structure of the step cut portion 117. Accordingly, the sealability can be stably kept high over a long period of time.

In this connection, since the highly expanded sponge member 118 continues to the highly expanded sponge member 119, the bottom face sealability of the base portion 111 can be continuously kept from the extrusion-molded portion 114 to the die-molded portion 115. Therefore, the sealability can be stabilized.

Referring to FIG. 8 and FIGS. 10 to 13, the third aspect of the present invention is explained below. The third aspect of the invention provides a retainerless weather strip to be attached to a door panel 220 of an automobile by an attaching means except for a retainer, in which: a highly expanded sponge member 213 is integrally provided along an automobile exterior side edge on a lower face of a base portion 211 of an extrusion-molded portion 214 by means of coextrusion molding; a predetermined portion of the extrusion-molded portion 214 is subjected to cutout-molding except for the base portion 211 and the highly expanded sponge member 213; and a die-molded portion 215 formed by means of die molding is integrated with a cutout portion 216 formed by means of the cutout-molding, so that the base portion 211 of the extrusion-molded portion 214 and the highly expanded sponge member 213 are extended to the die-molded portion 215.

The retainerless weather strip 210 of an embodiment of this aspect of the invention is attached to the door panel 220 of an automobile by a clip 218 which is an attaching means for attaching the weather strip except for the retainer. In this weather strip 210, a highly expanded sponge member (for example, a single foam highly expanded sponge member made of EPDM) is integrally provided by means of coextrusion molding along the automobile exterior side edge of the lower face of the base portion 211 of the extrusion-molded portion 214 which is molded by extrusion molding.

A predetermined portion (portion to be formed into a corner portion) of the extrusion-molded portion 214 is subjected to cutout-molding except for the base portion 211 and the highly expanded sponge member 213, and the thus formed cutout portion 216 is formed into the die-molded portion 215 which is formed into a predetermined shape by means of die molding. In this way, the base portion 211 and the highly expanded sponge member 213 of the extrusion-molded portion 214 are extended to the die-molded portion 215, so that they are continuously arranged without creating any joint on the lower face of the base portion 211.

The operation of this retainerless weather strip is explained below. In this weather strip 210, even in the corner portion (die-molded portion 215), the base portion 211 of the extrusion-molded portion 214 is extended as it is. Accordingly, the highly expanded sponge member 213 arranged on the lower face of the base portion 211 is not cut even at the connecting portion of the extrusion-molded portion 214 with the die-molded portion 215, that is, the highly expanded sponge member is continuously provided. Due to the foregoing, the lower face of the weather strip 210 and the door panel 220 can be perfectly sealed all over the region.

In the retainerless weather strip 210 of the present invention, a predetermined portion of the extrusion-molded portion 214 is subjected to cutout molding. Therefore, it may appears that the cost of molding is raised, however, the cost of molding is actually lowered when it is compared with a case in which a highly expanded sponge member, which is made separately, is made to adhere to the base portion 211 of the die-molded portion 215 by a post processing.

In the weather strip 210 of this embodiment, on the automobile interior side of the hollow seal portion 212, there is provided a cut-hole 217 through which a core used upon die molding is taken out. Due to the foregoing, it is unnecessary to form a drain hole on the automobile exterior side 250, and the sealability of the highly expanded sponge member 213 can be kept high.

Figure 12:
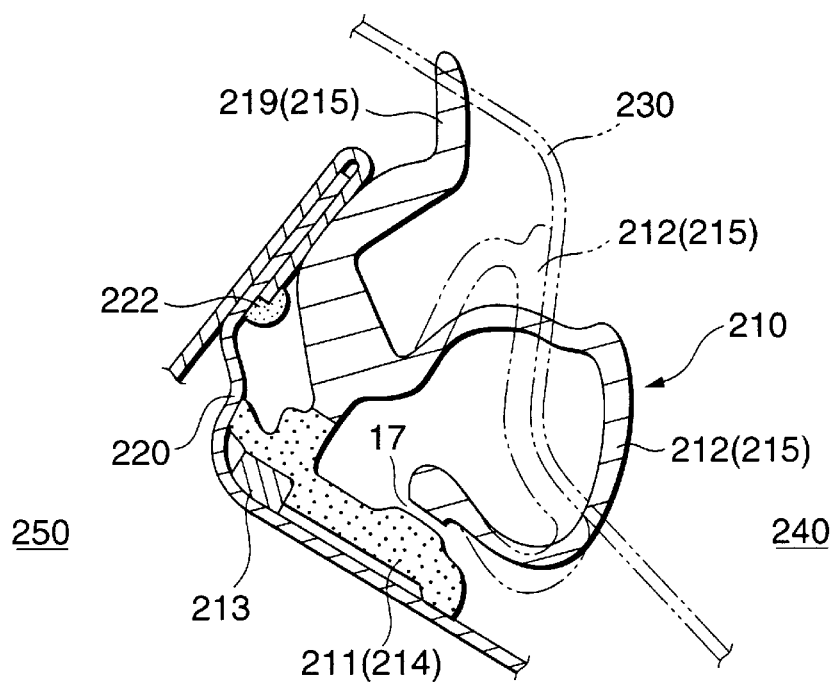
FIG. 12 is a cross-sectional view taken on line B2—B2 in FIG. 11.
Figure 13:
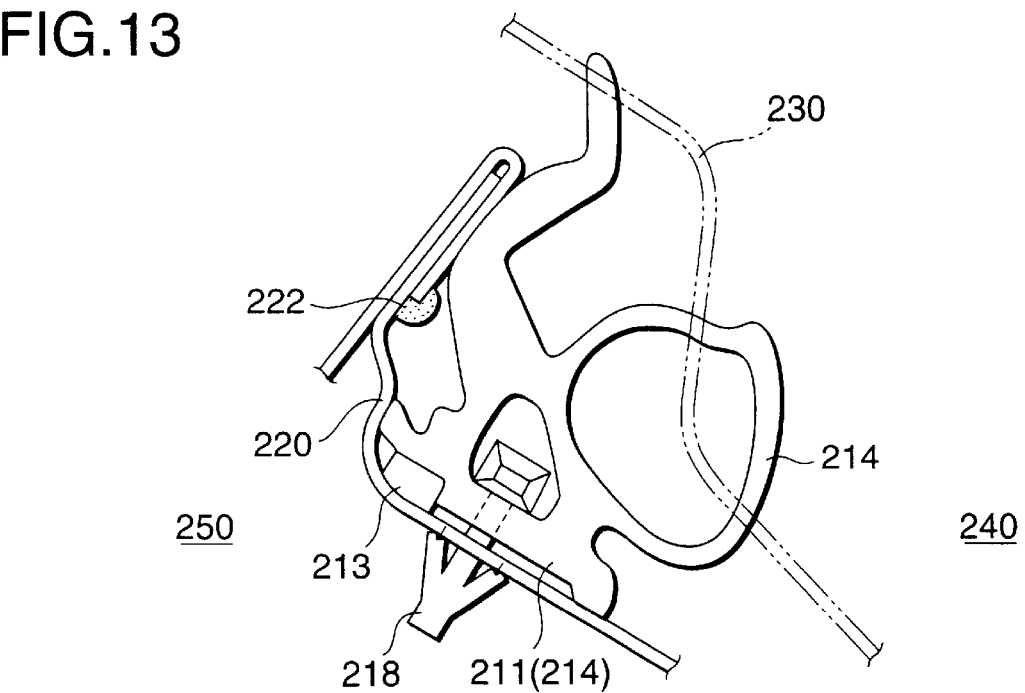
FIG. 13 is a cross-sectional view taken on line C2—C2 in FIG. 10.

In this weather strip 210, the hollow seal portion 212 is of a so-called compression type, which is to be compressed at a curved portion of the body panel 230 as shown by a virtual line in FIG. 12. Therefore, the weather strip 210 does not stand out even when it is viewed from the automobile interior side 240, that is, the appearance is excellent. In this connection, since the hollow seal portion 212 is of the compression type, this portion is given a force in the lower direction. Therefore, the cut-hole 217 for drawing the core therethrough can be closed by spot adhesion conducted by a cyanoacrylate-based instant adhesive agent. In this embodiment, the cut-hole 217 for drawing the core is arranged on the automobile interior side 240 of the hollow seal portion 212. However, the cut-hole 217 for drawing the core may be arranged in a boundary portion between the base portion 211 and the seal lip 219 on the automobile exterior side 250.

In this connection, the weather strip 210 of this embodiment is attached to the door panel 220 by the clip 218. However, as long as the attaching means is not a retainer, any means may be adopted, for example, an adhesive double-coated tape may be used.

In the third aspect of the present invention, since the base portion 211 of the extrusion-molded portion 214 is also extended as it is in the corner portion (die-molded portion 215). Therefore, the highly expanded sponge member 213 arranged on the lower face of the base portion 211 can be continuously arranged even at the connecting portion of the extrusion-molded portion 214 and the die-molded portion 215. Due to the foregoing, the sealability between the lower face of the weather strip 210 and the door panel 220 can be stabilized all over the region.

In the third aspect of the present invention, a predetermined portion of the extrusion-molded portion 214 is subjected to cutout-molding. When consideration is given to attaching the highly expanded sponge member 213 and the adhesive double-coated tape 218, the molding cost of the present invention can be reduced as compared with that of the conventional technique.

While the invention has been described in detail and with reference to specific embodiments thereof, it will be apparent to one skilled in the art that various changes and modifications can be made therein without departing from the spirit and scope thereof.

What is claimed is:

1. A retainerless weather strip to be fixed to a door panel of an automobile by a clip, which comprises:

a base bottom portion to be attached to the door panel;

a hollow seal portion to seal between the door panel and the body panel; and a seal lip portion, wherein the base bottom portion has a cutout-shaped step portion formed at a lower end portion on the automobile exterior side of the base bottom portion, and the weather strip further comprises a thick waterproof a sponge member provided on the cutout-shaped step portion, wherein the thick waterproof sponge member has a thickness sufficiently larger than the depth of the cutout-shaped step portion, and has an elasticity such that a portion in which the clip is located and portions in which the clip is not located can be equally elastically contracted when the base bottom portion is fixed to the door panel by the clip so that watertightness is kept between the thick waterproof sponge member and the door panel.

2. The retainerless weather strip according to claim 1, wherein the waterproof sponge member is softer than other portions of the base bottom portion.

3. The retainerless weather strip according to claim 1, wherein the base bottom portion has a protrusion elastically coming into contact with the door panel, provided between a clip insertion hole of the base bottom portion and the waterproof sponge member.

4. The retainerless weather strip according to claim 3, wherein the protrusion is formed being continued to the cutout-shaped step portion.

5. A retainerless weather strip to be attached to a door panel of an automobile by an attaching means except for a retainer, which comprises:

an extrusion-molded portion including a base portion having a cutout step portion formed on a lower face of the base portion of the extrusion-molded portion;

a highly expanded sponge member integrally provided on the cutout step portion by means of coextrusion molding;

a die-molded portion including a base portion having a step cut portion, which continues to the cutout step portion of the extrusion-molded portion, formed on a lower face of the base portion of a die-molded portion; and a highly expanded sponge member provided on the step cut portion.

6. A retainerless weather strip to be attached to a door panel of an automobile by an attaching means except for a retainer, which comprises:

an extrusion-molded portion including a base portion, wherein the extrusion-molded portion has a cutout-molded portion at a predetermined portion thereof, in which the extrusion-molded portion is cutout remaining the base portion;

a highly expanded sponge member integrally provided along an automobile exterior side edge on a lower face of the base portion of an extrusion-molded portion by means of coextrusion molding; and a die-molded portion formed by means of die molding and integrated with the cutout portion.

* * * * *